United States Patent [19]

Kovack

[11] Patent Number: 5,812,053
[45] Date of Patent: Sep. 22, 1998

[54] BRAKE HEAT GAUGE

[76] Inventor: Gary A. Kovack, P.O. Box 56, Sand Coulee, Mont. 59472

[21] Appl. No.: 804,472

[22] Filed: Feb. 21, 1997

[51] Int. Cl.[6] .................................................. B60C 23/00
[52] U.S. Cl. ........................ 340/449; 340/453; 340/454; 73/129; 188/1.11; 716/208; 200/61.4
[58] Field of Search ..................................... 340/449, 453, 340/454; 73/129; 116/208; 188/1.11; 200/61.4

[56] References Cited

U.S. PATENT DOCUMENTS 4,374,375  2/1983  Allori et al. ............................. 340/454

*Primary Examiner*—Jeffery Hofsass
*Assistant Examiner*—Julie B. Lieu

[57] ABSTRACT

A brake heat gauge for use with a vehicle with a plurality of wheels each with at least one brake shoe adapted to frictionally engage an associated brake drum upon the braking of the vehicle. The present invention includes a plurality of heat sensors each mounted on a corresponding brake shoe and adapted to transmit via the transmission wire a temperature signal representative of a temperature of the brake shoe. Also provided is a control panel situated within a cab of the vehicle which includes a temperature meter for visually indicating a temperature represented by a temperature signal upon the receipt thereof, a light emitting diode digital display adapted to display a number, a warning light adapted to emit light upon the actuation thereof, and an audible alarm adapted to transmit a sound upon the actuation thereof. Finally, a controller is connected via the transmission wires between the heat sensors of each of the wheels and the temperature meter, digital display, warning light, and audible alarm. In use, the controller is adapted to display on the temperature meter the temperature corresponding to the highest temperature measured by the heat sensors and further depict on the digital display a number corresponding to the wheel whose associated heat sensor measured the highest temperature.

4 Claims, 4 Drawing Sheets

BRAKE HEAT GAUGE

BACKGROUND OF THE INVENTION

1. Field of the Invention

The present invention relates to a brake heat gauge and more particularly pertains to monitoring the temperature of each brake of a vehicle and further alerting a driver upon the temperature of one of the brakes exceeding a predetermined amount.

2. Description of the Prior Art

The use of brake monitoring devices is known in the prior art. More specifically, brake monitoring devices heretofore devised and utilized for the purpose of allowing a driver to monitor the status of a set of brakes of a vehicle are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,649,370 to Thomason; U.S. Pat. No. 5,302,940 to Chen; U.S. Pat. No. 5,079,947 to Feldmann et al; U.S. Pat. No. 4,824,260 to Novotny et al.; and U.S. Pat. No. 4,845,468 to Stark.

In this respect, the brake heat gauge according to the present invention substantially departs from the conventional concepts and designs of the prior art, and in so doing provides an apparatus primarily developed for the purpose of monitoring the temperature of each brake of a vehicle and further alerting a driver upon the temperature of one of the brakes exceeding a predetermined amount.

Therefore, it can be appreciated that there exists a continuing need for a new and improved brake heat gauge which can be used for monitoring the temperature of each brake of a vehicle and further alerting a driver upon the temperature of one of the brakes exceeding a predetermined amount. In this regard, the present invention substantially fulfills this need.

SUMMARY OF THE INVENTION

In view of the foregoing disadvantages inherent in the known types of brake monitoring devices now present in the prior art, the present invention provides an improved brake heat gauge. As such, the general purpose of the present invention, which will be described subsequently in greater detail, is to provide a new and improved brake heat gauge which has all the advantages of the prior art and none of the disadvantages.

To attain this, the present invention essentially comprises a vehicle with a plurality of wheels each with at least one brake shoe adapted to frictionally engage an associated brake drum upon the braking of the vehicle. As shown in FIG. 1, each brake shoe comprises an outer curved portion and an inner arcuate connector plate. Further provided is a plurality of heat sensor mounting plates each with a lower portion coupled to a stationary disk of an associated wheel. See FIG. 1. As shown, the lower portion resides within a plane in which the inner arcuate connector plate resides. Each heat sensor mounting plate further has an upper portion integrally coupled to the associated lower portion and resides beside the inner arcuate connector plate. It should be noted that the upper portion resides in a plane offset from and in parallel with the plane in which the lower portion resides. For reasons that will be set forth hereinafter, the upper portion has a threaded bore centrally formed therein.

With reference to FIG. 2, a plurality of heat sensors are included each having a sensor portion with a cylindrical configuration having a free inboard end. Each heat sensor further has a mounting sleeve including a bolt formed adjacent an outboard end of the sensor portion. So that the heat sensor may be threadedly engaged within the threaded aperture of an associated mounting plate, a first threaded portion is centrally situated about the sensor portion. By this structure, the free inboard end of the sensor portion is in slidable communication with the inner arcuate connector of the brake shoe. The heat sensor further has a terminal formed on the outboard end thereof. The terminal includes a nut and a bolt for coupling with an eyelet coupled on an end of a transmission wire. As such, the heat sensor is adapted to transmit via the transmission wire a temperature signal representative of a temperature of the brake shoe. With reference now to FIG. 3, a control panel is situated within a cab of the vehicle. The control panel includes a temperature meter for visually indicating a temperature represented by a temperature signal upon the receipt thereof. A light emitting diode digital display is situated thereon and is adapted to display a number. Also included as a component of the control panel is a warning light adapted to emit light upon the actuation thereof. Finally, an audible alarm is included which is adapted to transmit a sound upon the actuation thereof. Connected between the heat sensors of each of the wheels and the temperature meter, digital display, warning light and audible alarm is control means. Such coupling is afforded via the transmission wires. As shown in FIG. 4, the wires are connected between the tractor and trailer via an adapter. During operation, the control means is adapted to display the temperature corresponding to the highest measured temperature and further depict on the digital display a number corresponding to the wheel whose associated heat sensor measured the highest temperature.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved brake heat gauge which has all the advantages of the prior art brake monitoring devices and none of the disadvantages.

It is another object of the present invention to provide a new and improved brake heat gauge which may be easily and efficiently manufactured and marketed.

It is a further object of the present invention to provide a new and improved brake heat gauge which is of a durable and reliable construction.

An even further object of the present invention is to provide a new and improved brake heat gauge which is susceptible of a low cost of manufacture with regard to both materials and labor, and which accordingly is then susceptible of low prices of sale to the consuming public, thereby making such brake heat gauge economically available to the buying public.

Still yet another object of the present invention is to provide a new and improved brake heat gauge which provides in the apparatuses and methods of the prior art some of the advantages thereof, while simultaneously overcoming some of the disadvantages normally associated therewith.

Still another object of the present invention is to monitor the temperature of each brake of a vehicle and further alert a driver upon the temperature of one of the brakes exceeding a predetermined amount.

Lastly, it is an object of the present invention to provide a new and improved brake heat gauge for use with a vehicle with a plurality of wheels each with at least one brake shoe adapted to frictionally engage an associated brake drum upon the braking of the vehicle. The present invention includes a plurality of heat sensors each mounted on a corresponding brake shoe and adapted to transmit via the transmission wire a temperature signal representative of a temperature of the brake shoe. Also provided is a control panel situated within a cab of the vehicle which includes a temperature meter for visually indicating a temperature represented by a temperature signal upon the receipt thereof, a light emitting diode digital display adapted to display a number, a warning light adapted to emit light upon the actuation thereof, and an audible alarm adapted to transmit a sound upon the actuation thereof. Finally, a controller is connected via the transmission wires between the heat sensors of each of the wheels and the temperature meter, digital display, warning light, and audible alarm. In use, the controller is adapted to display on the temperature meter the temperature corresponding to the highest temperature measured by the heat sensors and further depict on the digital display a number corresponding to the wheel whose associated heat sensor measured the highest temperature. In addition, the controller is adapted to actuate the warning light and the audible alarm upon the receipt of a temperature signal which is representative of a temperature which exceeds a predetermined alarm temperature.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
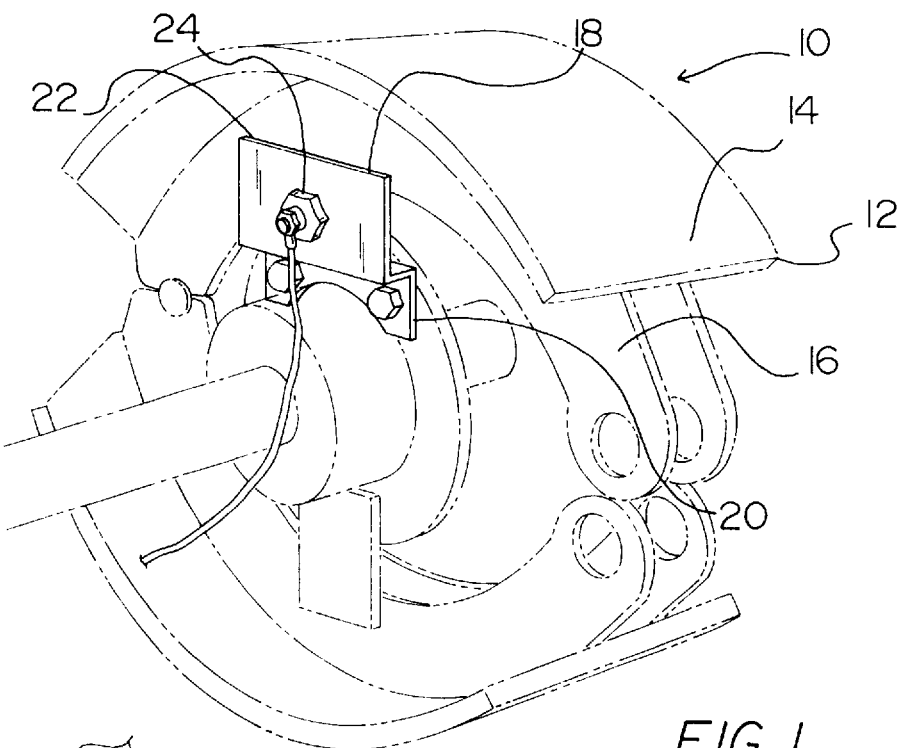
FIG. 1 is a perspective illustration of the preferred embodiment of the brake heat gauge constructed in accordance with the principles of the present invention.

With reference now to the drawings, and in particular to FIG. 1 thereof, a new and improved brake heat gauge embodying the principles and concepts of the present invention and generally designated by the reference numeral 10 will be described.

The present invention, the new and improved brake heat gauge, is comprised of a plurality of components. Such components in their broadest context include heat sensor mounting plates, heat sensors, a control panel, and control means. Such components are individually configured and correlated with respect to each other so as to attain the desired objective.

More specifically, it will be noted that the system 10 of the present invention includes a vehicle with a plurality of wheels each with at least one brake shoe 12 adapted to frictionally engage an associated brake drum upon the braking of the vehicle. As shown in FIG. 1, each brake shoe comprises an outer curved portion 14 and an inner arcuate connector plate 16.

Further provided is a plurality of heat sensor mounting plates 18 each with a lower portion 20 coupled to a stationary disk of an axle of an associated wheel via a pair of bolts. See FIG. 1. As shown, the lower portion resides within a plane in which the inner arcuate connector plate resides. Each heat sensor mounting plate further has an upper portion 22 integrally coupled to the associated lower portion and resides beside the inner arcuate connector plate. It should be noted that the upper portion resides in a plane offset from and in parallel with the plane in which the lower portion resides. For reasons that will be set forth hereinafter, the upper portion has a threaded bore centrally formed therein.

Figure 2:
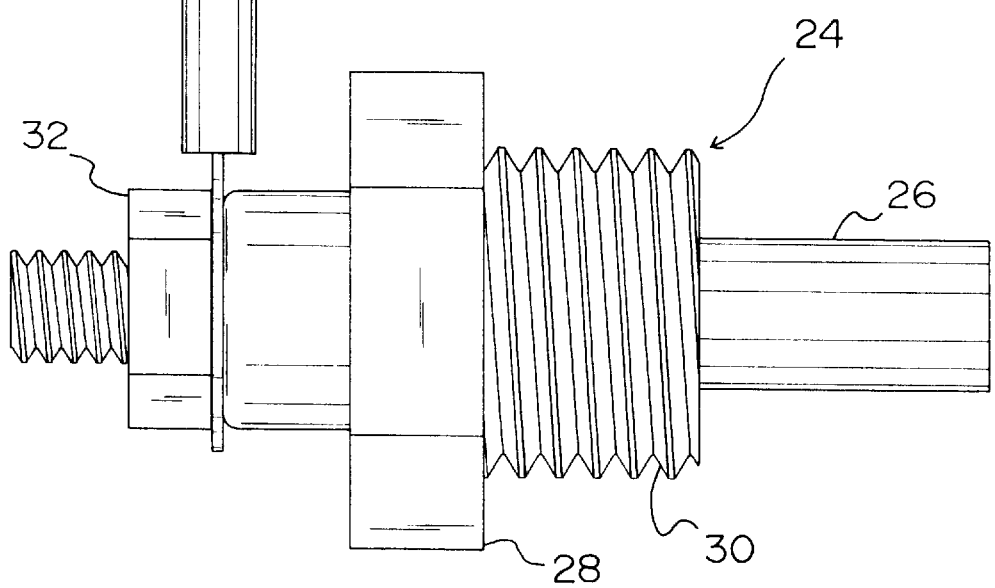
FIG. 2 is a close up view of the heat sensor shown in FIG. 1.

With reference to FIG. 2, a plurality of heat sensors 24 are included each having a sensor portion 26 with a cylindrical configuration having a free inboard end. Each heat sensor further has a mounting sleeve including a bolt 28 formed adjacent an outboard end of the sensor portion. So that the heat sensor may be threadedly engaged within the threaded aperture of an associated mounting plate, a first threaded portion 30 is centrally situated about the sensor portion. By this structure, the free inboard end of the sensor portion is in slidable communication with the inner arcuate connector of the brake shoe. The heat sensor further has a terminal formed on the outboard end thereof. The terminal includes a nut and a bolt 32 for coupling with an eyelet coupled to an end of a transmission wire. As such, the heat sensor is adapted to transmit via the transmission wire a temperature signal representative of a temperature of the brake shoe.

Figure 3:
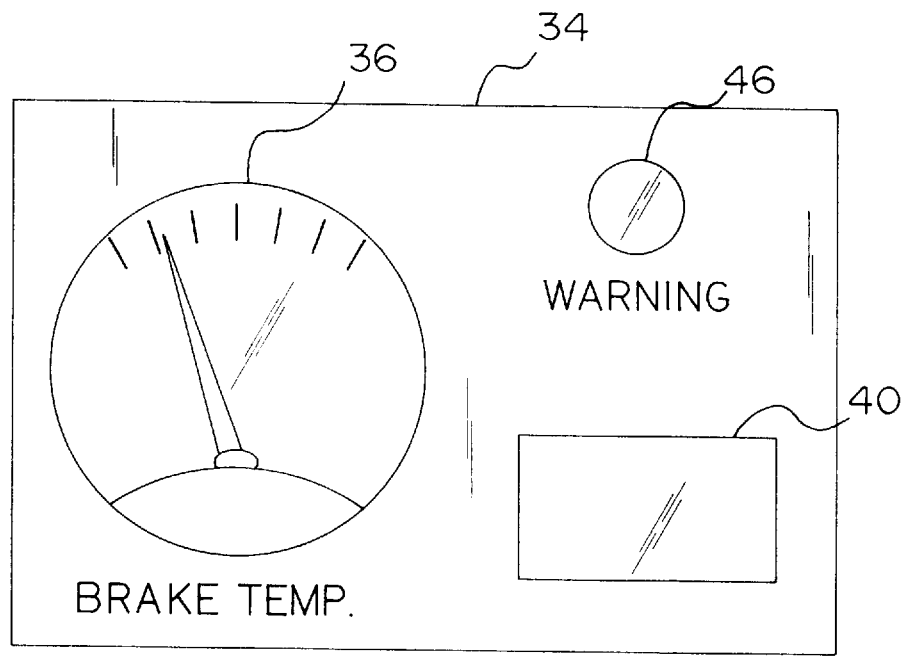
FIG. 3 is a front view of the control panel of the present invention.

With reference now to FIG. 3, a control panel 34 is situated within a cab of the vehicle. The control panel includes a temperature meter 36 for visually indicating a temperature represented by a temperature signal upon the receipt thereof. A light emitting diode digital display 38 is situated thereon and is adapted to display a number. Also included as a component of the control panel is a warning light 40 adapted to emit light upon the actuation thereof. Finally, an audible alarm 42 is included which is adapted to transmit a sound upon the actuation thereof.

Figure 4:
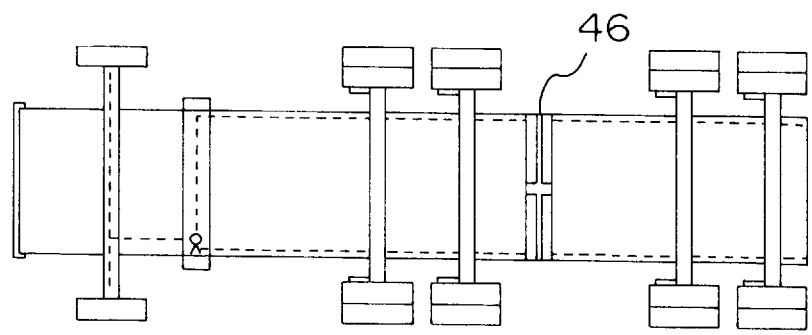
FIG. 4 is a layout of the distribution of the transmission wires of the present invention.

Connected between the heat sensors of each of the wheels and the temperature meter, digital display, warning light and audible alarm is control means 44. Such coupling is afforded via the transmission wires 45. As shown in FIG. 4, the wires are connected between the tractor and trailer via an adapter 46. During operation, the control means is adapted to display on the temperature meter the temperature corresponding to the highest temperature measured by the heat sensors and further depict on the digital display a number corresponding to the wheel whose associated heat sensor measured the highest temperature. In addition, the control means is adapted to actuate the warning light and the audible alarm upon the receipt of a temperature signal which is representative of a temperature which exceeds a predetermined alarm temperature.

Figure 5:
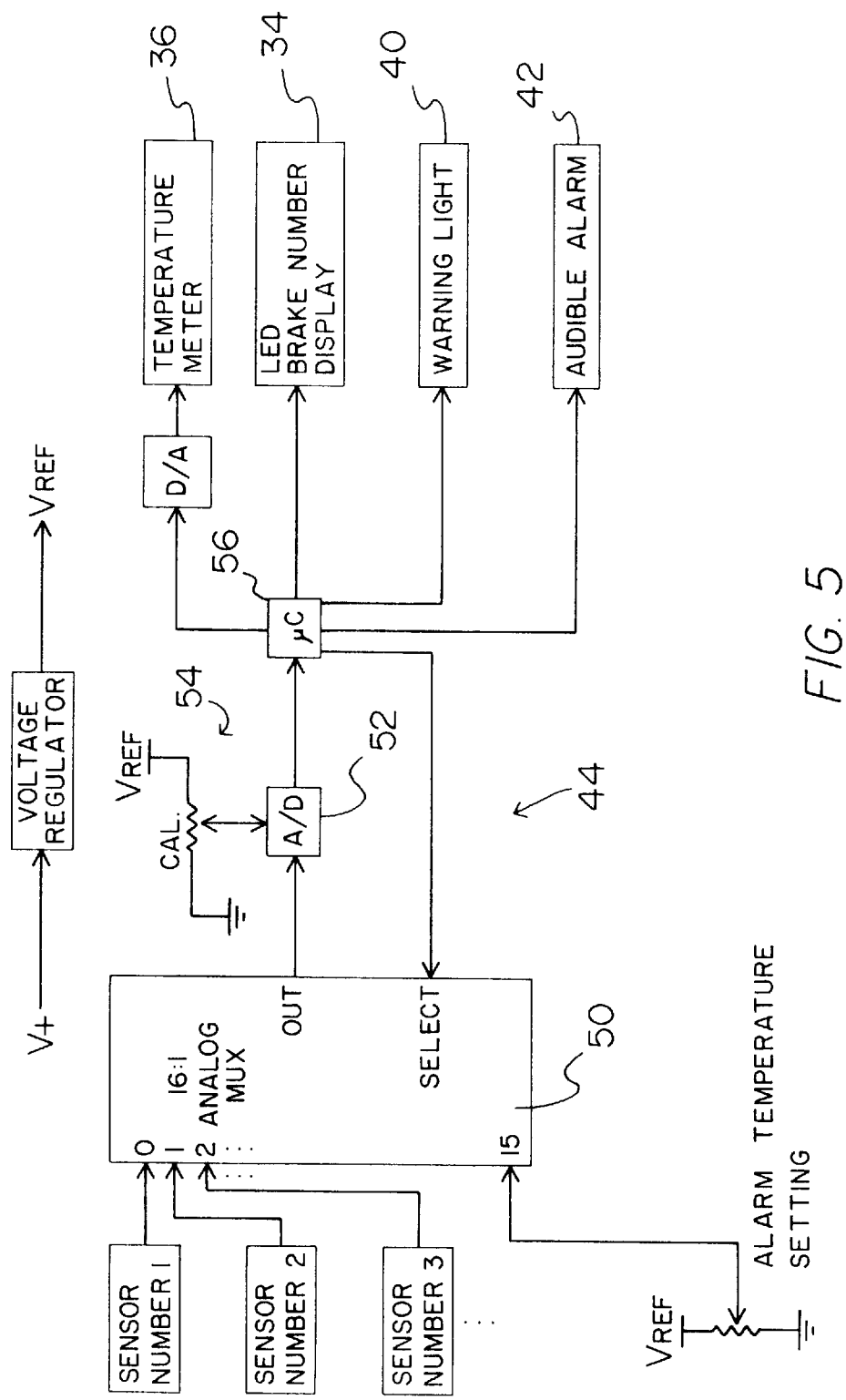
FIG. 5 is a schematic diagram depicting the interconnection of the electrical components associated with the control means of the present invention.

As shown in FIG. 5, the control means comprises an analog 16:1 multiplexer 50 with a plurality of inputs each connected to an associated heat sensor. It should be noted that one of the inputs is reserved for the alarm temperature which is selected by a user. Such alarm temperature is the value which if exceeded, the audible alarm and warning light actuate. The multiplexer may also be constructed with a different number of inputs depending on the number of wheels the vehicle has. The multiplexer further has an output adapted to transmit the temperature signal from a temperature sensor which is selected by means of a select input thereof. Connected to the output of the multiplexer is an analog to digital converter(A/D converter) 52 for transmitting a digital equivalent of the analog temperature received from the multiplexer. For affording greater accuracy, the analog to digital converter has adjustment means 54 for consistently shifting the value received from the heat sensors.

Control circuitry 56 is connected between the A/D converter and the temperature meter, digital display, warning light and audible alarm. Such control circuitry affords the specific method in which the present invention operates. To accomplish such, the control circuitry is adapted to store a highest temperature representative of a greatest temperature received.

The method associated with the present invention first includes the step of selecting, in order, each heat sensor via the selection input of the multiplexer. Between each selection the temperature received from the current heat sensor is compared with the highest temperature. If the forgoing temperature is greater than the highest temperature it is stored as the highest temperature. If the temperature is stored in the previous step, the wheel from which the temperature was measured is displayed and the temperature received from the heat sensor is compared with the alarm temperature, whereby upon the temperature being greater than the alarm temperature an alarm flag is set. It should be noted that the alarm temperature is the last value which is imputed to the control circuity for allowing the above comparison. It should be noted that the comparison of all of the inputs takes no more than a few microseconds.

Figure 6:
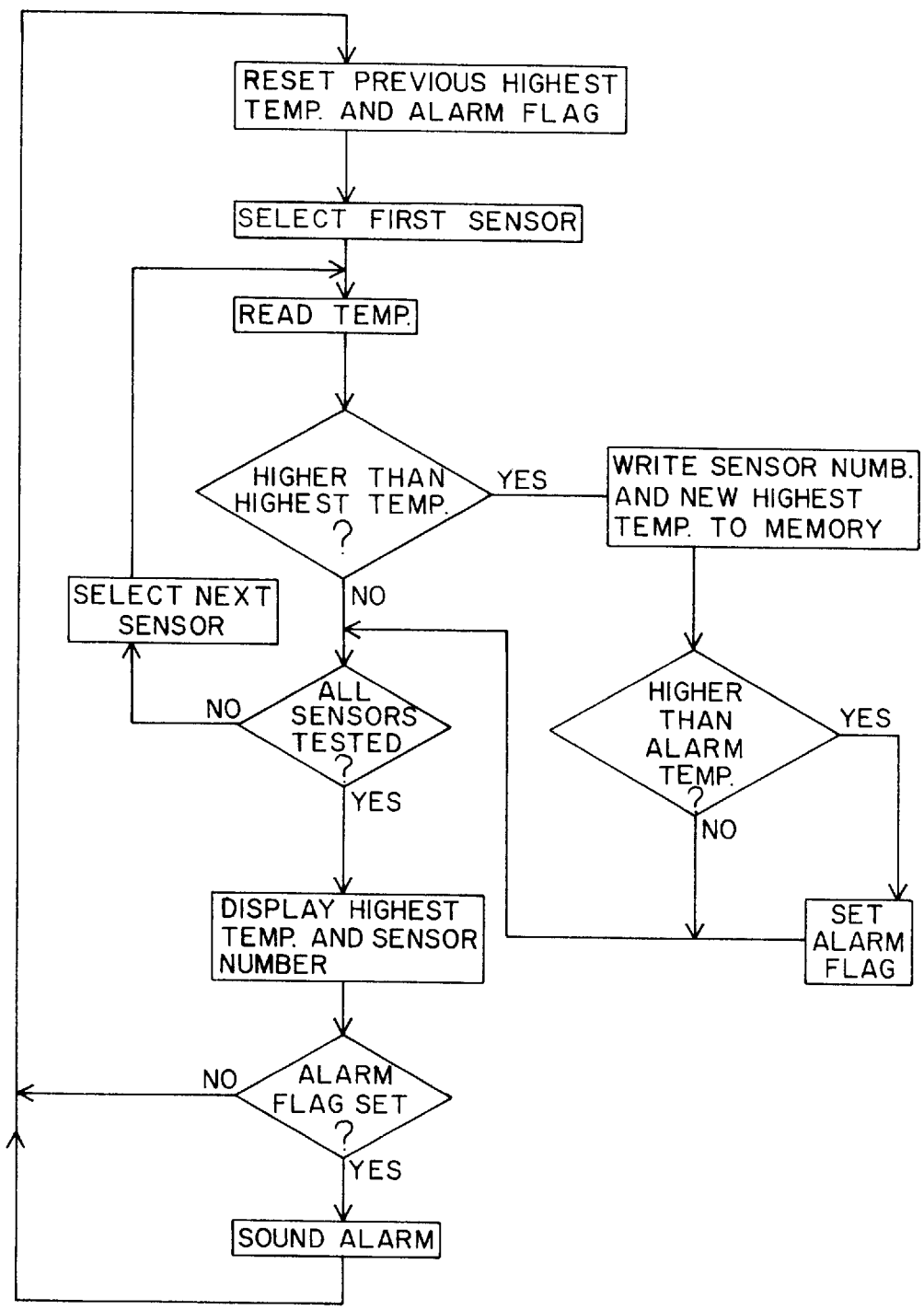
FIG. 6 is a flow chart illustrating the method associated with the present invention.

After a temperature signal is received from each heat sensor, the highest temperature is displayed on the temperature meter. Finally, the warning light and audible alarm are actuated only if the alarm flag is set. As is apparent from FIG. 6, the highest temperature and alarm flag is cleared and reset respectively and the method is continuously repeated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved brake heat gauge comprising, in combination:

a vehicle with a plurality of wheels each with at least one brake shoe adapted to frictionally engage an associated brake drum upon the braking of the vehicle, wherein each brake shoe comprises an outer curved portion and an inner arcuate connector plate;

a plurality of heat sensor mounting plates each with a lower portion coupled to a stationary disk of an associated wheel such that lower portion resides within a plane in which the inner arcuate connector plate resides, each heat sensor mounting plate further having an upper portion integrally coupled to the associated lower portion and residing beside the inner arcuate connector plate and within a plane offset from and in parallel with the plane in which the lower portion resides, the upper portion having a threaded bore centrally formed therein;

a plurality of heat sensors each having a sensor portion with a cylindrical configuration having a free inboard end, a mounting sleeve including a bolt formed adjacent an outboard end of the sensor portion and a first threaded portion centrally situated about the sensor portion such that the heat sensor may be threadedly engaged within the threaded aperture of an associated mounting plate via the bolt, wherein the free inboard end of the sensor portion is in slidable communication with the inner arcuate connector of the brake shoe, the heat sensor further having a terminal formed on the outboard end thereof, the terminal including a nut and a bolt for coupling with an eyelet coupled on an end of a transmission wire, whereby the heat sensor is adapted to transmit via the transmission wire a temperature signal representative of a temperature of the brake shoe;

a control panel situated within a cab of the vehicle, the control panel including a temperature meter for visually indicating a temperature represented by a temperature signal upon the receipt thereof, a light emitting diode digital display adapted to display a number, a warning light adapted to emit light upon the actuation thereof, and an audible alarm adapted to transmit a sound upon the actuation thereof; and control means connected via the transmission wires between the heat sensors of each of the wheels and the temperature meter, digital display, warning light, and audible alarm, the control means adapted to display the temperature corresponding to the greatest measured temperature and further depict on the digital display a number corresponding to the wheel whose associated heat sensor measured the highest temperature, the control means further adapted to actuate the warning light and the audible alarm upon the receipt of a temperature signal which is representative of a temperature which exceeds a predetermined alarm temperature.

2. A brake heat gauge comprising:

a vehicle with a plurality of wheels each with at least one brake shoe adapted to frictionally engage an associated brake drum upon the braking of the vehicle;

a plurality of heat sensors each mounted on a corresponding brake shoe and adapted to transmit via the transmission wire a temperature signal representative of a temperature of the brake shoe;

a control panel situated within a cab of the vehicle, the control panel including a temperature meter for visually indicating a temperature represented by a temperature signal upon the receipt thereof, a light emitting diode digital display adapted to display a number, a warning light adapted to emit light upon the actuation thereof, and an audible alarm adapted to transmit a sound upon the actuation thereof; and control means connected via the transmission wires between the heat sensors of each of the wheels and the temperature meter, digital display, warning light, and audible alarm, the control means adapted to display on the temperature meter the temperature corresponding to the highest measured temperature and further depict on the digital display a number corresponding to the wheel whose associated heat sensor measured the highest temperature, the control means further adapted to actuate the warning light and the audible alarm upon the receipt of a temperature signal which is representative of a temperature which exceeds a predetermined alarm temperature;

wherein each brake shoe comprises an outer curved portion and an inner arcuate connector plate and further including a plurality of heat sensor mounting plates each with a lower portion coupled to a stationary disk of an associated wheel such that lower portion resides within a plane in which the inner arcuate connector plate resides, each heat sensor mounting plate further having an upper portion integrally coupled to the associated lower portion and residing beside the inner arcuate connector plate and within a plane offset from and in parallel with the plane in which the lower portion resides, the upper portion having a threaded bore centrally formed therein.

3. A brake heat gauge as set forth in claim 2 wherein each heat sensor includes a plurality of heat sensors each having a sensor portion with a cylindrical configuration having a free inboard end, a mounting sleeve including a bolt formed adjacent an outboard end of the sensor portion and a first threaded portion centrally situated about the sensor portion such that the heat sensor may be threadedly engaged within the threaded aperture of an associated mounting plate via the bolt, wherein the free inboard end of the sensor portion is in slidable communication with the inner arcuate connector of the brake shoe, the heat sensor further having a terminal formed on the outboard end thereof, the terminal including a nut and a bolt for coupling with an eyelet coupled on an end of a transmission wire, whereby the heat sensor is adapted to transmit via the transmission wire a temperature signal representative of a temperature.

4. A new and improved method of monitoring temperature of a plurality of brakes and further providing an alarm upon the temperature surpassing a predetermined amount, the method comprising the steps of:

providing a vehicle with a plurality of wheels each with at least one brake shoe adapted to frictionally engage an associated brake drum upon the braking of the vehicle, wherein each brake shoe comprises an outer curved portion and an inner arcuate connector plate;

providing a plurality of heat sensor mounting plates each with a lower portion coupled to a stationary disk of an associated wheel such that lower portion resides within a plane in which the inner arcuate connector plate resides, each heat sensor mounting plate further having an upper portion integrally coupled to the associated lower portion and residing beside the inner arcuate connector plate and within a plane offset from and in parallel with the plane in which the lower portion resides, the upper portion having a threaded bore centrally formed therein;

providing a plurality of heat sensors each having a sensor portion with a cylindrical configuration having a free inboard end, a mounting sleeve including a bolt formed adjacent an outboard end of the sensor portion and a first threaded portion centrally situated about the sensor portion such that the heat sensor may be threadedly engaged within the threaded aperture of an associated mounting plate via the bolt, wherein the free inboard end of the sensor portion is in slidable communication with the inner arcuate connector of the brake shoe, the heat sensor further having a terminal formed on the outboard end thereof, the terminal including a nut and a bolt for coupling with an eyelet coupled on an end of a transmission wire, whereby the heat sensor is adapted to transmit via the transmission wire a temperature signal representative of a temperature of the brake shoe;

providing a control panel situated within a cab of the vehicle, the control panel including a temperature meter for visually indicating a temperature represented by a temperature signal upon the receipt thereof, a light emitting diode digital display adapted to display a number, a warning light adapted to emit light upon the actuation thereof, and an audible alarm adapted to transmit a sound upon the actuation thereof; and providing control means connected via the transmission wires between the heat sensors of each of the wheels and the temperature meter, digital display, warning light, and audible alarm, the control means adapted to store a highest temperature representative of a highest temperature received, an alarm temperature, and an alarm flag therein;

selecting in order each heat sensor, whereby upon the selection of each heat sensor the present step includes:
comparing the temperature received from the heat sensor with the highest temperature and storing said temperature as the highest temperature only if said temperature is greater than the highest temperature,
comparing the temperature received from the heat sensor with the alarm temperature if the temperature is stored in the previous step, whereby upon the temperature being greater than the alarm temperature an alarm flag is set, and displaying on the digital display a number corresponding to the wheel whose associated heat sensor measured the highest temperature;

displaying on the temperature meter the highest temperature; and actuating the warning light and audible alarm if the alarm flag is set.

* * * * *